United States Patent
Ashibe

[11] 3,788,456
[45] Jan. 29, 1974

[54] METHOD AND APPARATUS FOR AUTOMATICALLY SEPARATING ENTANGLED SPRINGS

[76] Inventor: Keitaro Ashibe, c/o Tenryu Seiki Co., Ltd., 15853 Akaho, Nagano-ken, Komagane-shi, Japan

[22] Filed: Feb. 24, 1972

[21] Appl. No.: 228,883

[30] Foreign Application Priority Data
Feb. 27, 1971 Japan................... 46-10286

[52] U.S. Cl.... 198/220 A, 198/220 BC, 198/33 AA
[51] Int. Cl. ............................................ B65g 27/00
[58] Field of Search... 198/220 A, 220 BC, 220 DA, 198/DIG. 3, DIG. 15, 33 AA; 193/27

[56] References Cited
UNITED STATES PATENTS

| | | | |
|---|---|---|---|
| 3,542,185 | 11/1970 | Geyer et al. | 198/33 AA |
| 3,504,783 | 4/1970 | Kuschnereit | 198/33 AA |
| 3,042,181 | 7/1962 | Rise | 198/33 AA |
| 2,740,552 | 4/1956 | Palmer | 193/27 |
| 2,764,351 | 9/1956 | Broscomb et al. | 198/33 AA |
| 3,034,633 | 5/1962 | Clifford et al. | 198/33 AA |
| 3,266,613 | 8/1966 | Grafius | 198/33 AA |
| 2,771,191 | 11/1956 | Kath | 198/33 AA |
| 366,721 | 7/1887 | Graves | 193/27 |
| 3,635,324 | 1/1972 | Burgess, Jr. | 198/33 AA |
| 2,760,679 | 8/1956 | Chadderton et al. | 198/33 AA |

OTHER PUBLICATIONS
J. W. Philippovic, "Hopper Feeding," August, 1962.

Primary Examiner—Evon C. Blunk
Assistant Examiner—Joseph E. Valenza
Attorney, Agent, or Firm—John J. McGlew et al.

[57] ABSTRACT

A method and apparatus for automatically separating entangled springs from one another, wherein the separating operation of entangled springs is effected by dashing them against plates arranged fixedly within a tubular separating housing in vertically spaced and zigzag relation to one another. The separating operation is followed by a further sorting of the springs to remove the individual springs which have been separated and to return the unseparated springs to a vibratory bowl sorter and feeder which has a connection to a pneumatic conveyor for returning springs still unseparated back to the separating housing.

4 Claims, 4 Drawing Figures

METHOD AND APPARATUS FOR AUTOMATICALLY SEPARATING ENTANGLED SPRINGS

BACKGROUND OF THE INVENTION

This invention relates to a method and apparatus for automatically separating entangled springs from one another.

When a plurality of spiral springs such as coil springs or the like have been stored together within a container, there is a tendency for some of the springs to become entangled. Accordingly, such entangled springs have to be separated from one another. Hitherto, such separation has been carried out manually. This is naturally a troublesome and time consuming labor.

SUMMARY OF THE INVENTION

An object of this invention is to provide a method and apparatus for automatically separating entangled springs from one another. of Another object of this invention is to provide a novel and simple apparatus for automatically separating entangled springs.

Another object of this invention is to provide an apparatus wherein the separating operation of entangled springs is effected by dashing them against fixed plates.

In accordance with this invention, the above objects and other advantages are attained by enforcedly dashing the entangled springs against one or more plates. In a preferable embodiment of this invention, said plates are fixedly disposed within a vertical tubular housing having an inlet and outlet at upper and lower ends thereof, respectively, so that the entangled springs forcedly fed into said housing through said inlet are impacted against said plates to be untangled. These plates are inclined downwards and a gap is left between the lower end thereof and the circumferential inner wall of said housing so as not to intercept the untangled springs. Moreover, these plates are arranged in vertically spaced and zigzag relation to one another for enhancing the efficiency of the separating operation.

BRIEF DESCRIPTION OF THE DRAWINGS

Other objects and advantages will become more readily apparent when considered in view of the drawings and specifications in which.

DESCRIPTION OF THE PREFERRED EMBODIMENT

Figure 1:
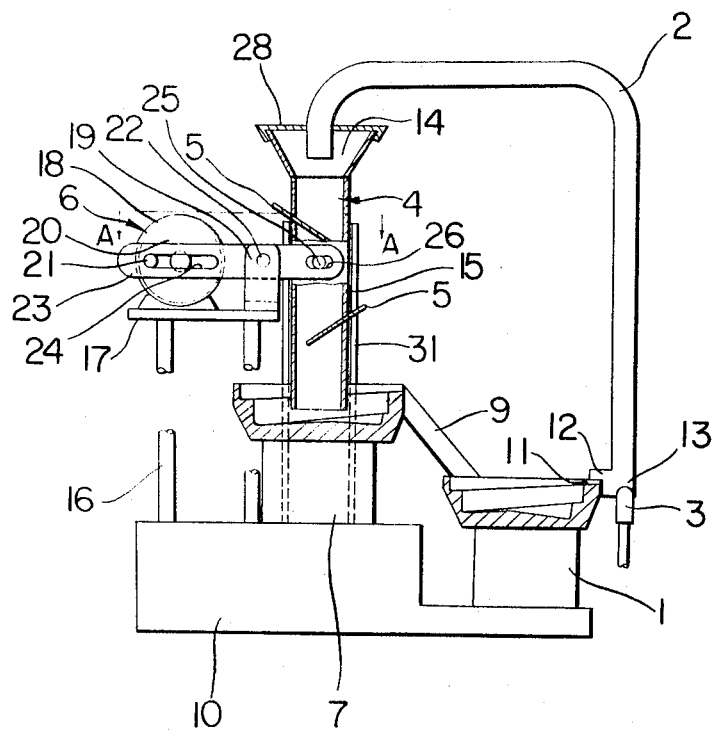
FIG. 1 is a front elevation view, partly in section, illustrating the apparatus for automatically separating entangled springs in accordance with the present invention.

Referring to the drawings, the apparatus for automatically separating entangled springs from one another comprises a base 10 on which a first conveying device 1 is firmly mounted for use in moving continuously a number of entangled springs one group at a time in a predetermined direction for subsequent process. Briefly described, such conventional type of device, which is disclosed in Japanese Pat. publication Sho 29/6330, comprises a dish-like container having a spiral conveying passage formed in the inner surface with a slight rising gradient and an electromagnet type of vibrator disposed under said dish-like container to impart vibrating reciprocating movement along said spiral passage. The bottom surface inclined from the center thereof toward the periphery causes entangled springs to roll down from the center. The vibrations applied by the vibrator causes the entangled springs to move upwardly one by one from the bottom surface to an outlet 11 along the spiral passage having a slightly inclined surface.

The outlet 11 of the first conveying device 1 is connected to an end 12 of a flexible feeding pipe 2 which extends upwardly and is opened into a separating housing 4 through an aperture in a cover plate 28 secured to a flared portion 14.

Connected to the lower end portion 13 of the feeding pipe 2 adjacent to the first conveying device 1 is a nozzle 3 which is connected to a fluid source under pressure. The separating housing 4 comprises additionally a square tubular chamber 15 which is provided with a pair of inclined plates 5 arranged fixedly in vertically spaced and zigzag relation to each other, onto which plates the entangled springs conveyed at a high speed through the feeding pipe 2 are impacted and separated from one another. If necessary, the number of the fixed plates 5 mounted within the separating housing 4 may be increased for higher efficiency. The tubular chamber 15 is supported at the opposite sides for vertical reciprocation by guide bearing rollers 29. Each of rollers 29 is mounted for rotation around a shaft 30 secured to a projection of a support member 31 firmly mounted on the base 10.

Figure 2:
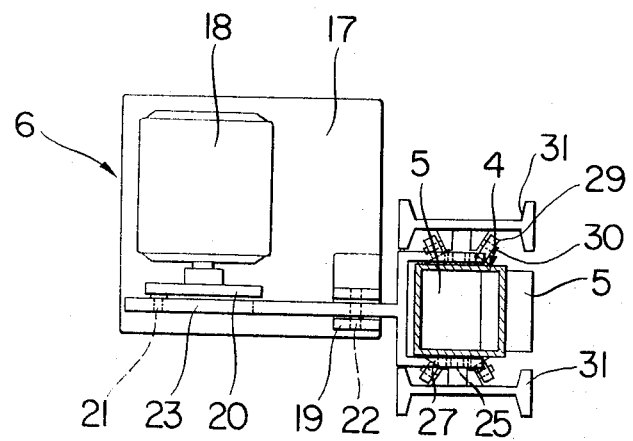
FIG. 2 is an enlarged plan view, taken on the plane of the line A—A of FIG. 1, illustrating an oscillating device for imparting oscillations to a separating housing.

Provided adjacent to the separating housing 4 is an oscillating device 6 for imparting oscillations or vertical reciprocations to the separating housing to enhance the efficiency of the separating operation. Supported on leg members 16 extending upwardly from the base 10 is a base plate 17 on which a motor 18 and a lever bearing stand 19 are firmly mounted with screws or the like. As shown in FIG. 2, a flanged disk 20 having a pin 21 projecting therefrom is firmly mounted on the shaft of the motor 18 by means of key. Pivotally supported on a pin 22 mounted on the lever bearing stand 19 is a lever 23 which is formed at one end into the shaft of fork. The forked end portion 27 is provided at the opposed sides with slots 26 which engage the respective pins 25 projecting from the opposed sides of the tubular housing 4, while at the other end of the lever 23 an elongated slot 24 engages the pin 21 projecting from the flanged disc 20.

It will be readily understood from the above description that when the motor 18 has been energized, the pin 21 on the flanged disc 20 is rotated, causing the lever 23 to be oscillated around the pin 22, so that the oscillating or reciprocating movement of the separating housing 4 can be effected.

Figure 3:
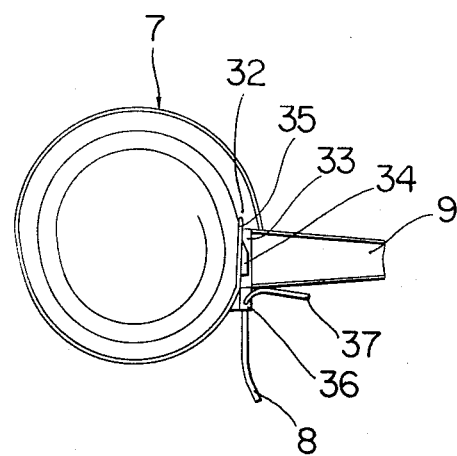
FIG. 3 is a plan view of a discharging device provided with a return chute and a discharging tube.
Figure 4:
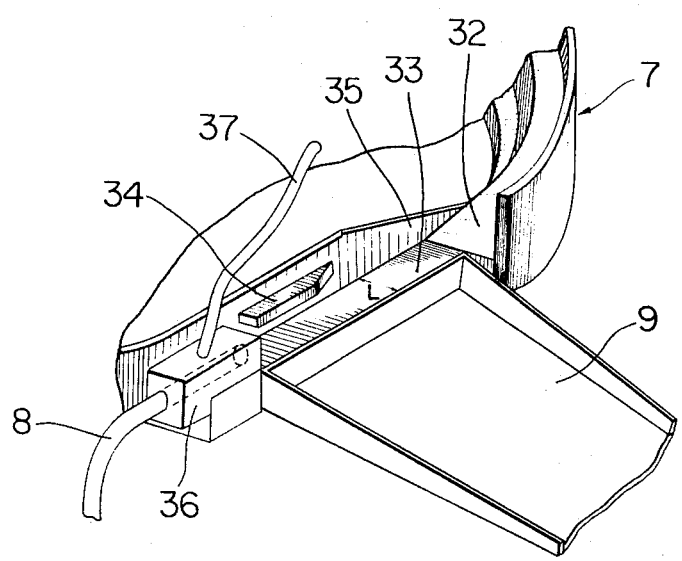
FIG. 4 is a perspective view on an enlarged scale of an outlet portion of the discharging device.

Disposed under the separating housing 4 to receive the untangled springs is a second conveying device 7 of conventional type which is of construction similar to the first conveying device 1 and is provided at the outlet end base the spiral passage 32 with a flow control plate 33 as disk Pivotally shown in FIGS. 3 and 4. The flow control plate 33 is adjustably mounted on a fixed side wall 35 and can be so adjusted at a right angle to the advancing direction of the untangled springs that the distance L from the side wall 35 to the free end of the flow control plate is substantially equal to the outer diameter of the untangled springs. The flow control plate 33 so adjusted permits each of untangled springs to be orientated in a row and to be passed therethrough under the influence of vibrations, while any springs remaining entangled fall down out of the flow control plate 33 into a return chute 9 connected to the first conveying device 1. Furthermore, in order to prevent any upright springs from passing through the flow control plate 33, an ejector 34 is vertically adjustably mounted on the side wall 35. Fixedly mounted at the discharging end adjacent to the flow control plate 33 is a discharging portion 36 having a longitudinal orifice slightly greater than the diameter of the untangled spring. The discharging portion 36 is provided at the front end with a discharging tube 8 for discharging the untangled springs one by one and at the upper surface with a flexible tube for feeding compressed air to force out each of the untangled springs in the discharging tube 8.

In operation, when a number of entangled springs are charged within the dish-like container of the first conveying device 1 vibrated, they are moved upwardly along the spiral passage of the first conveying device 1 under the influence of vibrations and introduced into the feeding pipe 2. Then a fluid under pressure blowing out from the nozzle 3 conveys the entangled springs at a high speed through the feeding pipe 2 into the separating housing 4 and forces them to dash against the fixed plates 5, thus producing an impact force enough to separate the entangled springs from one another. If desired, the oscillating device 6 may be operated to promote the separating operation of the separating housing 4. The springs untangled within the separating housing 4 fall down from the lower opening thereof into the second conveying device 7, where they are moved upwardly along the spiral passage toward the outlet 32 under the influence of vibration.

As previously mentioned, the untangled springs and other springs remaining entangled are selected at the outlet of the second conveying device 7 by means of the flow control plate 33 and the ejector 37, that is, the untangled springs are passed through the flow control plate and fed into the discharging pipe 8 one by one by means of a fluid under pressure, while the entangled springs fall down into the return chute 9 and returned into the first conveying device 1. The entangled springs which are returned are directed through the same operations as stated above are repeated until the entangled springs are completely separated from one another.

From the above description it will be apparent that the apparatus of this invention is relatively simple and effective in operation. While the instant invention has been disclosed with reference to a particular apparatus for efficiently performing the same, it is to be appreciated that the invention is not to be taken as limited to all of the details thereof as modifications and variations thereof may be made without departing from the spirit or scope of the invention.

What is claimed is:

1. A spring separating device comprising a drop shaft having a closed top portion and an open bottom and having at least one downwardly sloping impact plate therein between the top portion and said bottom, a dish-shaped first vibrating conveyor located below said drop shaft and having a bottom located to receive springs from said drop shaft and having an upwardly spiraling continuous side wall track which when said first conveyor is vibrated causes movement of springs from the bottom to the top of said first spring conveyor, a second dish-shaped conveyor corresponding to said first dish-shaped conveyor, a discharge chute extending from said first dish-shaped conveyor to said second dish-shaped conveyor, sorting means adjacent the top of said first conveyor for removing separated springs and for deflecting unseparated groups of springs into said discharge chute, a fluid conduit having a suction inlet at the top of said second conveyor and a discharge connected downwardly into said drop shaft, said suction inlet being in a position to engage springs which are fed to the top of said second conveyor, and means for circulating fluid through said fluid conduit for inducing a flow of springs through said conduit and downwardly into said drop shaft to direct them at high force against said impact plate therein to cause separation thereof.

2. A spring separating device, according to claim 1, including means for vibrating said drop shaft in order to increase the impacting forces on said springs.

3. A spring separating device, according to claim 2, wherein said drop shaft includes a plurality of impact plates spaced along the height thereof and extending outwardly from associated opposite walls in alternately arranged manner along the height thereof.

4. A spring separating device, according to claim 3, wherein said means for circulating fluid through said fluid conduit includes a fluid nozzle connected into said conduit adjacent said suction inlet.

* * * * *